United States Patent [19]

Nabata

[11] Patent Number: 5,510,181
[45] Date of Patent: Apr. 23, 1996

[54] LUBRICANT AND MAGNETIC RECORDING MEDIUM USING THE SAME

[75] Inventor: Yoshiyuki Nabata, Tochigi, Japan

[73] Assignee: Kao Corporation, Tokyo, Japan

[21] Appl. No.: 87,864

[22] Filed: Jul. 9, 1993

[30] Foreign Application Priority Data

Jul. 21, 1992 [JP] Japan ..................................... 4-194284

[51] Int. Cl.$^6$ ............................... G11B 5/66; B32B 5/16; B32B 27/00
[52] U.S. Cl. .......................... 428/336; 428/341; 428/421; 428/422; 428/694 T; 428/694 TP; 428/694 TF; 428/695; 428/900
[58] Field of Search .......................... 428/694 T, 694 TP, 428/694 TF, 900, 336, 341, 421, 422, 695

[56] References Cited

U.S. PATENT DOCUMENTS

| | | | |
|---|---|---|---|
| 3,778,308 | 12/1973 | Roller | 117/234 |
| 4,268,556 | 5/1981 | Pedrotty | 428/65 |
| 4,897,211 | 1/1990 | Dekura et al. | 252/54 |
| 5,374,480 | 12/1994 | Nishikowa | 428/336 |

*Primary Examiner*—Leszek Kiliman
*Attorney, Agent, or Firm*—Nixon & Vanderhye

[57] ABSTRACT

A fluorine-containing lubricant having a linear structure devoid of polar groups at the terminals of its molecule, and has at least two polar groups on the intermediate carbon chain of the molecule is disclosed. A magnetic recording medium employing the lubricant is also disclosed.

3 Claims, No Drawings

LUBRICANT AND MAGNETIC RECORDING MEDIUM USING THE SAME

FIELD OF THE INVENTION

This invention relates to a lubricant. It also relates to a magnetic recording medium using the same.

BACKGROUND OF THE INVENTION

The contact start-stop system (CSS system) is the leading type of start-stop system in hard disk devices using a flying type magnetic head. In the drive using "CSS system", a magnetic head for recording and reproduction contacts the surface of a disk at the time of the start and stop of the disk's rotation. The magnetic head slides on the surface of the disk while in contact with the surface of the disk. Because of this, the magnetic head and the disk are often damaged by abrasion, and if this becomes serious, head crash occurs.

Protective films composed of carbon, predominantly amorphous carbon, or silicon dioxide has been proposed on magnetic layers to prevent this problem.

The use of a liquid lubricant such as a perfluoroalkylpolyether coated on the protective film has also been proposed because the use of the protective film only is considered insufficient; see U.S. Pat. No. 3,778,308.

The distance between the magnetic layer and the magnetic head must be shortened to increase recording density. To achieve this, it is necessary to reduce both the thickness of the protective layer and the roughness of disk surface. For improved durability, a thicker lubricant layer is preferred. However, when this thickness is increased, it not only makes the disk unsuited for high-density recording, but also causes adsorption of the magnetic head to the surface of the disk. To prevent this, it has recently been proposed to reduce the thickness of the lubricant layer to only several tens of Å which corresponds to a lubricant layer of only several molecules thick.

However, an interaction between the magnetic or protective layer formed by a thin film forming method such as dry-process plating (e.g., sputtering) or wet-process plating and the lubricant molecule is generally weak. Because of this, when the lubricant layer is only a few molecules thick, the lubricant is likely to be spun off or dissipated by centrifugal force when the disk is rotated or by negative pressure when the magnetic head passes by. These factors also decrease the durability of the lubricating function.

Methods in which a polar group is bonded to the terminal of a perfluoroalkylpolyether chain provide an increased interaction between the magnetic layer or the protective layer and the lubricant molecule have been proposed, thereby the durability of the lubricating function is improved without increasing the thickness of the lubricant layer as described in U.S. Pat. Nos. 4,267,238 and 4,268,556, and JP-B-60-10368 (the term "JP-B" as used herein means an "examined Japanese patent publication").

However, the present inventor has found that these procedures still insufficient.

Magnetic recording mediums are shocked and rubbed by the magnetic head and are subjected to very severe use conditions. It is unavoidable that the lubricating film coated on the surface of the protective layer is scattered or liable to be unevenly distributed on the outer periphery of the disk by a centrifugal force. To avoid these problems, it has been proposed to introduce a polar group into the terminal of the perfluoroalkylpolyether chain. However, it has been found that, when the polar group is introduced into the terminal, the interaction between the protective layer and the lubricant layer is still insufficient, and also the adsorption produced by the terminal polar group is apt to be detached. It has also been found that the adsorption produced by the terminal polar group is apt to be more easily detached with increasing in the length of the molecular chain when the molecular weight of the perfluoropolyoxyethylene group is increased.

It has now been found that, when a lubricant having a structure devoid of polar groups at the terminals of its molecule, but with polar groups on the intermediate carbon chain, both lubricating function and durability can be further improved.

SUMMARY OF THE INVENTION

The present invention provides a lubricant composed of a fluorine-containing compound having a specific structure and a magnetic recording medium using the lubricant.

Another object of the present invention is to provide a magnetic recording medium which is excellent in lubricating function as well as durability.

The present invention is characterized by a fluorine-containing lubricant having a linear structure. The lubricant is devoid of polar groups at the terminals of its molecule, but has at least two polar groups on the intermediate carbon chain of the molecule.

The present invention also includes a magnetic recording medium comprising a substrate having thereon a magnetic layer and a lubricant layer wherein the lubricant layer is the uppermost layer and comprises the lubricant as described above.

DETAILED DESCRIPTION OF THE INVENTION

It is preferred that the lubricant of the present invention has a linear structure of a repeating unit of —$(C_nF_{2n}O)_m$— wherein n is an integer of 1 to 3, and m is an integer, and that the polar groups present on the intermediate carbon chain of the molecule are selected from the group consisting of the residue of a carbonyl group-containing compound, the residue of an isocyanate group-containing compound and the residue of a hydroxyl group-containing compound. Further, it is preferable that the terminal group of the lubricant is —$CF_3$, and the lubricant has a number average molecular weight of about 4,000 to abut 100,000.

Examples of the residue of a carbonyl group-containing compound, the residue of an isocyanate group-containing compound and the residue of a hydroxyl group-containing compound include the followings.

Residue of Isocyanate Group-containing Compound:

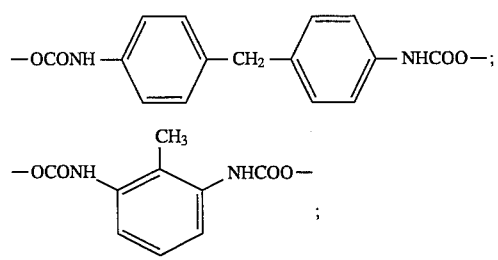

-continued

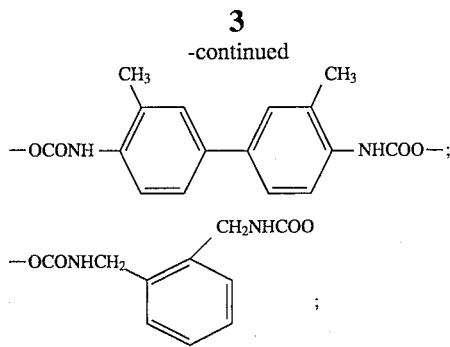

and

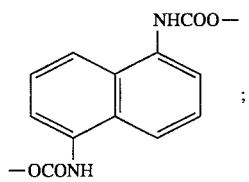

Residue of Carboxylic Group-containing Compound:

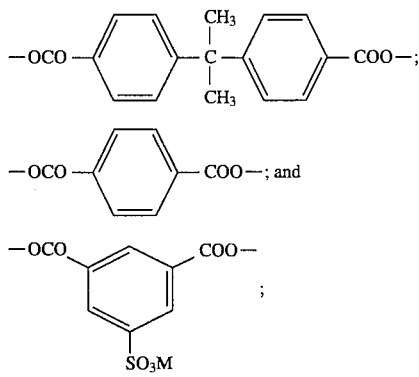

(M is H, Na or K); and

Residue of Hydroxy Group-containing Compound:

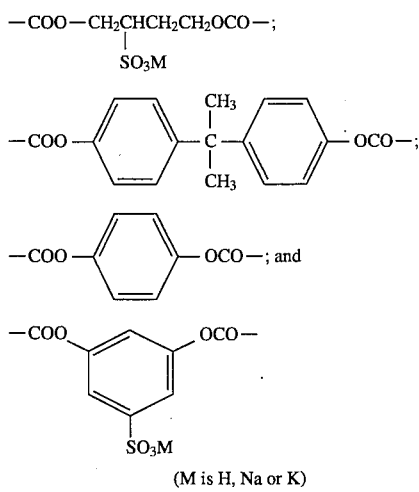

(M is H, Na or K)

More preferably, the lubricant is a compound represented by the following formula (I):

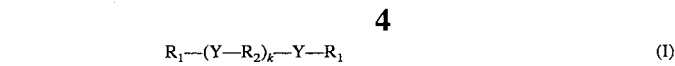

wherein Y is selected from the group consisting of the residue of a carboxyl group-containing compound, the residue of an isocyanate group-containing compound and the residue of a hydroxyl group-containing compound, and all Y groups in formula (I) may be the same or different; $R_1$ represents a perfluoropolyether chain comprising a repeating unit of $(C_aF_{2a}O)_b$, wherein a is 1, 2 or 3, and b is an integer of at least 1, preferably from 1 to 60, more preferably at least 2, which is terminated by —$CF_3$ and has a number average molecular weight of about 400 to 10,000, preferably 4,000 to 10,000, and all $R_1$ groups in formula (I) may be the same or different; $R_2$ represents a perfluoropolyether chain comprising a repeating unit of $(C_cF_{2c}O)_c$ wherein c is 1, 2 or 3, and d is an integer of at least 1, preferably from 1 to 60, more preferably at least 2 and having a number average molecular weight of about 1,000 to 10,000, preferably 1,000 to 4,000, and all $R_2$ groups in formula (I) may be the same or different; and k is an integer of at least 1.

In the above formula (I), the group represented by $R_1$ may comprise either exclusively the same units or plural units different from each other.

It is furthermore preferred that 2 to 50 Y groups, more preferably 2 to 6 Y groups, are contained in the lubricant of formula (I).

This lubricant does not have any polar group at its terminals, but has at least two polar groups on the intermediate carbon chain of the molecule. Even when the length of the linear structure is increased, the physical adsorption force of the lubricating film to the surface of the inorganic material such as metal, ceramic or carbon is strong, and it is difficult to detach. Namely, the lubricant is scattered by centrifugal force only with difficulty, and the lubricating function remains over a long period of time.

Due to strong adsorption force, the lubricant remains its lubricating function over a long period of time when allowed to exist on the surface of the magnetic recording medium even if the lubricant layer is very thin such as only a few molecules in thickness. As a consequence, the distance between the magnetic layer and the magnetic head can be shortened, which makes the magnetic recording medium suited for high density recording.

On the other hand, increasing the length of the liner structure in conventional types lubricants where the polar groups are bonded to the terminals of the linear structure makes the lubricant lager more likely detached from the medium. If the detached polar group is adsorbed by the magnetic head, a head crash is liable to occur. In the present invention, the polar groups are positioned not at the terminals of the molecule, but on the intermediate carbon chain of the molecule. Because of this unique arrangement, even when the length of the linear structure is increased, the polar group is only detached with difficultly. Even if the polar group is detached from the medium, the probability of it being adsorbed by the magnetic head is low because the molecule is not terminated by polar groups and this avoids head crashes.

Specific examples of the lubricants suitable for use according to the present invention are each any one of the followings. However, the lubricants suitable for use according to the present invention are not to be construed as limited by these examples.

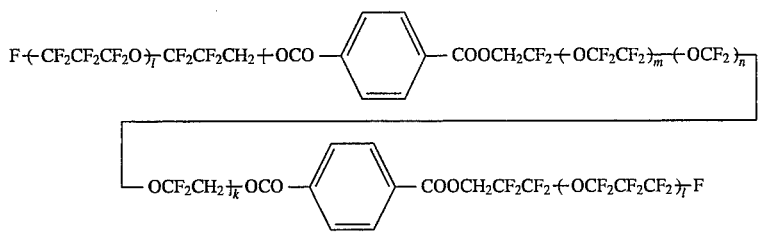
(1)
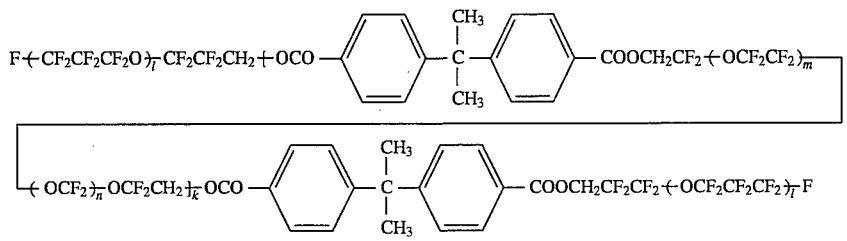
(2)
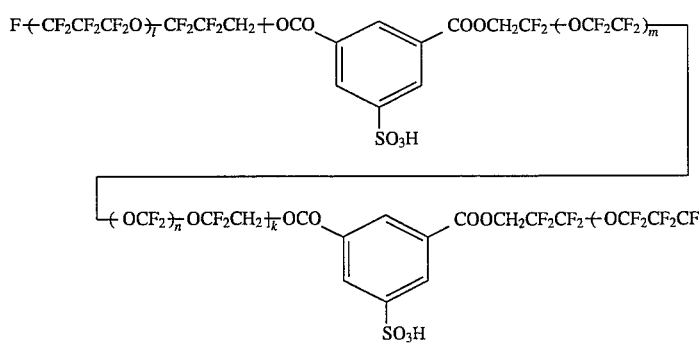
(3)
(wherein in the above formulae (1) to (3), l, m and n are integers, and k is an integer of at least 1, provided that the number average molecular weight of the compound of each formula is 4,000 to 100,000);
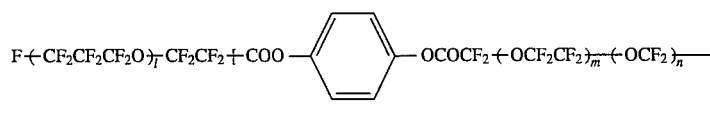
(4)
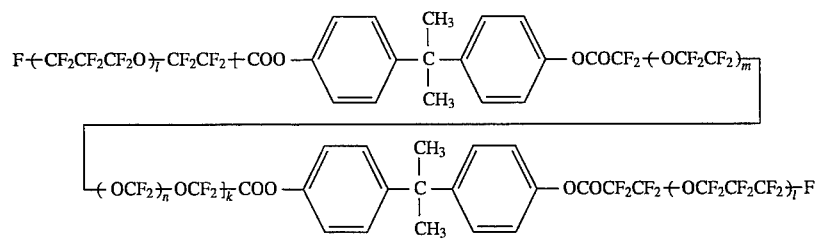
(5)

-continued
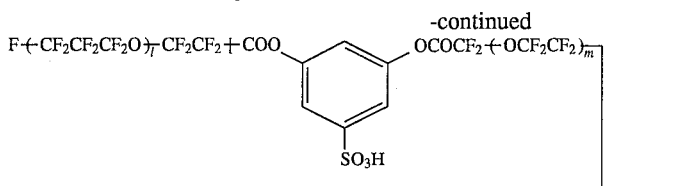 (6)
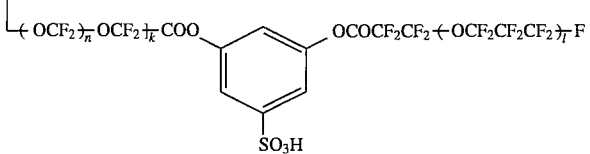
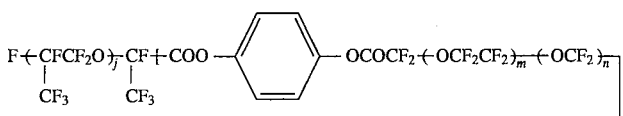 (7)
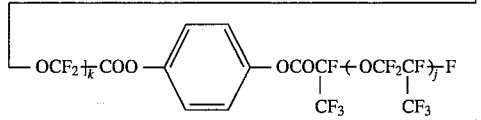
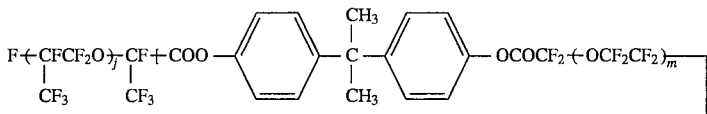 (8)
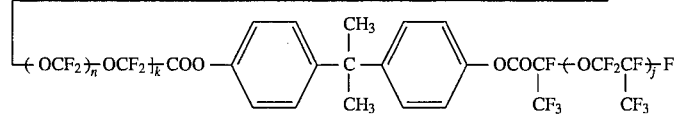
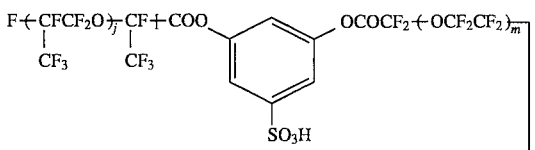 (9)
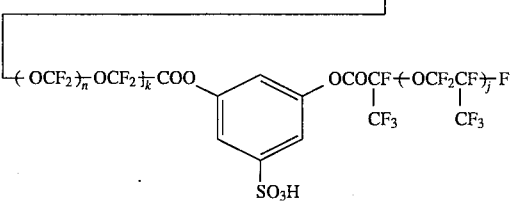
(wherein in the above formulae (4) to (9), j, l, m and n are integers, and k is an integer of at least 1, provided that the number average molecular weight of the compound of each formula is 4,000 to 100,000); and
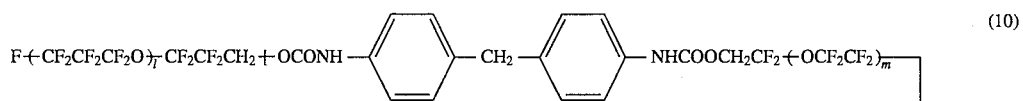 (10)
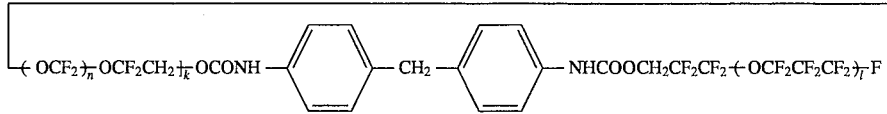

-continued

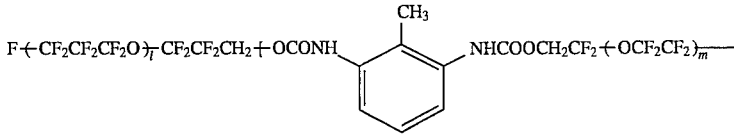
(11)

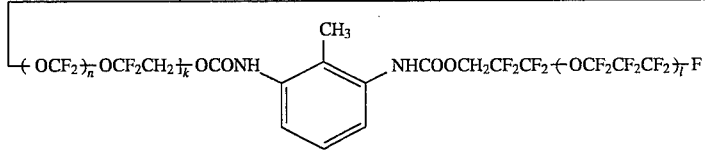
(12)

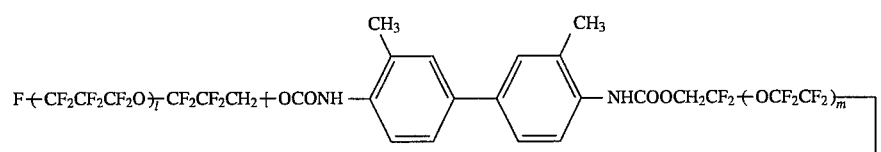
(13)

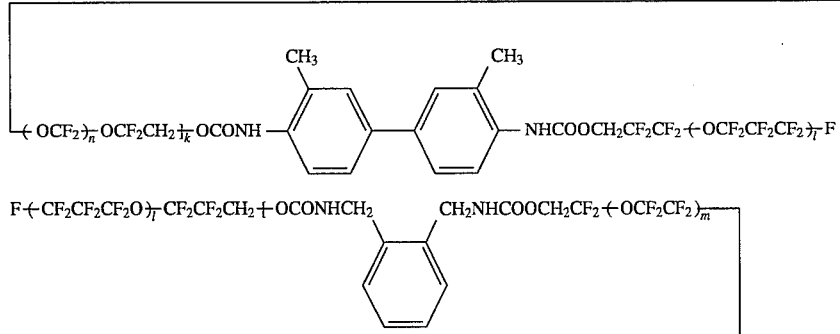
(14)

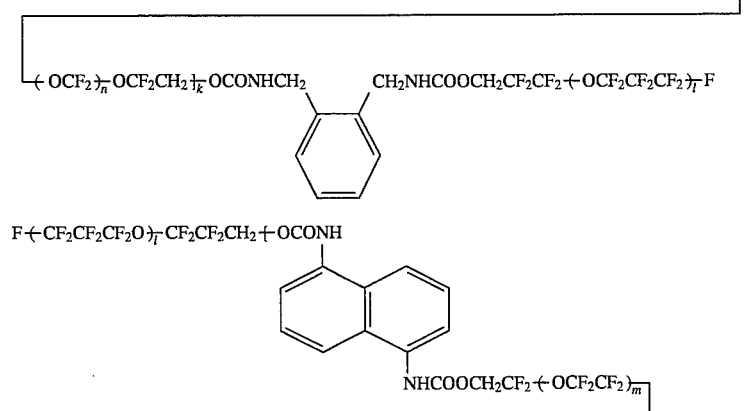

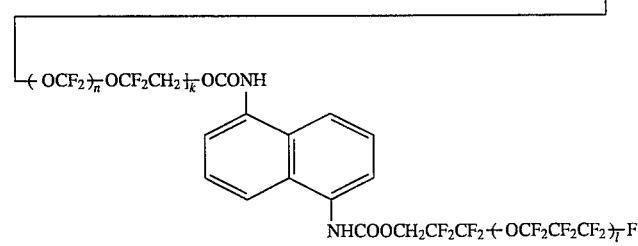

(wherein in the above formulae (10) to (14), l, m and n are integers, and k is an integer of at least 1, provided that the number average molecular weight of the compound of each formula is 4,000 to 100,000)

The magnetic recording medium according to the present invention can be prepared in a conventional manner. The lubricant layer comprising the lubricant of the present invention can also be provided in a conventional manner such as dip coating.

Examples of materials for the substrate include, for instance, Al—Mg alloys, glass, carbon and titanium.

Examples of material for the magnetic layer include, for instance, Co—Cr—Ta, Co—Cr—Pt and Co—Ni—Pt alloys.

The present invention is now illustrated in greater detail by reference to the following examples which, however, are not to be construed as limiting the present invention in any way.

EXAMPLE 1

To a 500 ml three-necked flask equipped with a stirrer, a reflux condenser and a thermometer, there were added 200 g of perfluoroalkylpolyether having both ends terminated by OH groups (i.e., the compound represented by formula: $HOCH_2CF_2O-(CF_2CF_2O)_n-(CF_2O)_m-CF_2CH_2OH$; n/m=1; number average molecular weight=2,000) and 200 ml of 1,1,2-trichloro-1,2,2-trifluoroethane as a solvent. The mixture was uniformly mixed. While the resulting solution was stirred at 30° C., 55 g of diphenylmethane diisocyanate dissolved in 100 ml of 1,1,2-trichloro-2,2-trifluoroethane was added dropwise thereto over a period of 10 minutes using a dropping funnel, and the mixture was reacted for 5 hours. Subsequently, 20 g of perfluoropolyether having one end terminated by a OH group (i.e., the compound represented by formula: $F-(CF_2CF_2CF_2O-)CF_2CF_2CH_2OH$; l is an integer; number average molecular weight=2,000) dissolved in 50 ml of 1,1,2-trichloro-2,2-trifluoroethane was added dropwise over a period of 10 minutes using a dropping funnel, and the mixture was continuously reacted for 5 hours.

After cooling, the reaction solvent was removed under reduced pressure. The residue was extracted with perfluorohexane. The extract was repeatedly washed, and perfluorohexane was evaporated to obtain an oily product.

The IR spectrum analysis of the oily product showed that absorption due to OH group present in the vicinity of 3600 to 3000 $cm^{-1}$ disappeared, and absorption due to NH group of urethane group in the vicinity of 1540 $cm^{-1}$ and absorption due to CO group in the vicinity of 1735 $cm^{-1}$ appeared.

The molecular weight of this product was measured. The product had a number average molecular weight of 10,000. The product was considered to be a compound having the following structural formula:

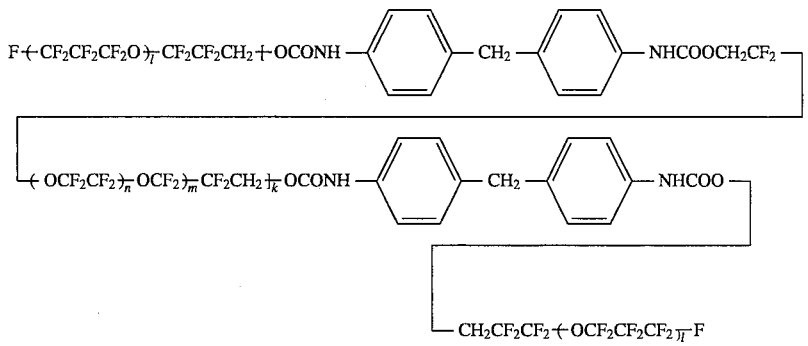

wherein l, n and m are integers, and k is an integer of at least 1.

The product was a fluorine-containing compound having a linear structure with no polar groups at the terminals of the molecule; the terminal group was —$CF_3$ and the compound had at least two polar groups on the intermediate carbon chain of the molecule.

A Ni-P-plated aluminum substrate was abraded and subjected to a texture treatment to obtain a substrate having a center line surface roughness Ra of 4 nm. A Cr layer of 50 nm and a CoCrTa (Co: 76%, Cr: 12%, Ta: 2%) magnetic layer of 40 nm were formed on the substrate in an Ar gas atmosphere by a DC magnetron sputtering process. Further, a carbon protective film of 20 nm in thickness was formed thereon. Subsequently, the lubricant prepared above, diluted with Fluorinert FC77 was uniformly coated on the carbon protective film of the magnetic disk by a dip coating method and then cured to form a lubricant layer.

The thickness of the lubricant layer was measured by a high sensitive reflection method using Fourier transform infrared spectrophotometer 1720×(manufactured by Perkin-Elmer). The thickness was 21 Å.

EXAMPLE 2

To a 500 ml four-necked flask equipped with a stirrer, a reflux condenser, a Dien Stark tube and a thermometer, there were added 200 g of perfluoroalkylpolyether having both ends terminated by COOH groups (i.e, the compound represented by formula: $HOOC-CH_2CF_2O-(CF_2CF_2O)_n-(CF_2O)_m-CF_2CH_2-COOH$; n/m=1; average molecular weight=2,000), 4 g of p-toluenesulfonic acid and 200 ml of perfluorodecalin as a solvent, and mixture was uniformly mixed. While the resulting solution was stirred at 80° C., 48 g of bisphenol A dissolved in 100 ml of perfluorodecalin was added dropwise over a period of 10 minutes by using a dropping funnel, and a dehydration-condensation reaction was continued until water was no longer collected in the Dien Stark tube. Subsequently, 20 g of perfluoropolyether having one end terminated by COOH groups (i.e., the compound represented by formula: $F-(CF_2CF_2CF_2O-)-CF_2CF_2COOH$; number average molecular weight=2,000) dissolved in 50 ml of perfluorodecalin was added dropwise over a period of 10 minutes using a dropping funnel, and a dehydration-condensation reaction was continued until dehydrated water was no longer collected.

After cooling, the reaction solvent was removed under reduced pressure. The residue was extracted with perfluorohexane, and the extract was repeatedly washed. Subsequently, perfluorohexane was evaporated to obtain an oily product.

The IR spectrum analysis of the oily product showed that absorption due to a carbonyl group in the vicinity of 1780 $cm^{-1}$ was shifted to nearly 1735 $cm^{-1}$.

The molecular weight of the product was measured. The product had a number average molecular weight of 8,000. The product was considered to be a compound having the following structural formula:

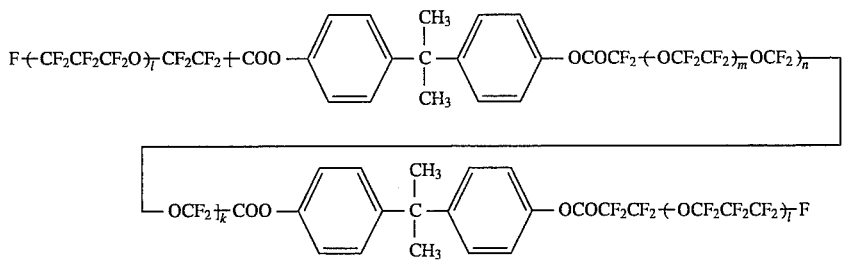

wherein l, n and m are integers, and k is an integer of at least 1.

The product was a linear fluorine-containing compound with no polar groups at the terminals of the molecule; the terminal group was —$CF_3$ and the compound had at least two polar groups on the intermediate carbon chain of the molecule.

A Ni-P-plated aluminum substrate was abraded and subjected to a texture treatment to obtain a substrate having a center line surface roughness Ra of 4 nm. A Cr layer of 50 nm and a CoCrTa (Co: 76%, Cr: 12%, Ta: 2%) magnetic layer of 40 nm were formed on the substrate in an Ar gas atmosphere by a DC magnetron sputtering process. Further, a carbon protective layer of 20 nm in thickness was formed thereon. The lubricant prepared above, diluted with Fluorinert FC77 was uniformly coated on the carbon protective layer of the magnetic disk by a dip coating method, and cured to form a lubricant layer.

The thickness of the lubricant layer was measured by a high sensitive reflection method using Fourier transform infrared spectrophotometer 1720×(manufactured by Perkin-Elmer). The thickness was 20 Å.

Comparative Example 1

A lubricant layer was formed in the same manner as in Example 1 except that Fomblin AM2001 (tradename of a product manufactured by Montecatini) was used in place of the lubricant used in Example 1 to obtain a magnetic disk. The thickness of the lubricant layer was measured by a high sensitive reflection method using Fourier transform infrared spectrophotometer 1720×(a product of Perkin-Elmer).

The thickness was 21 Å.

Comparative Example 2

A lubricant layer was formed in the same manner as in Example 1 except that Fomblin Y-25 (tradename of a product manufactured by Montecatini) was used in place of the lubricant used in Example 1 to obtain a magnetic disk.

The thickness of the lubricant layer was measured by a high sensitive reflection method using Fourier transform infrared spectrophotometer 1720×(a product of Perkin-Elmer). The thickness was 19 Å.

Comparative Example 3

A lubricant layer was formed in the same manner as in Example 1 except that a fluorinated polyether polymer wherein both ends thereof being terminated by OH group (lubricant described in JP-B-60-10368) was used in place of the lubricant used in Example 1 to obtain a magnetic disk.

The thickness of the lubricant layer was measured by a high sensitive reflection method using Fourier transform infrared spectrophotometer 1720×(a product of Perkin-Elmer). The thickness was 20 Å.

The magnetic disks prepared above were subjected to CSS test (a thin film head comprising a sintered material of $Al_2O_3$ and TiC, manufactured by Read Write (U.S.A.), is used to a slider material, and a test is carried out by a 15 sec-operation/ 15 sec-stop cycle under conditions of head load=9.5 gf, F.H.=0.15 μm and 3600 rpm), and the CSS resistance characteristics were examined by disk frictional wear tester PT101 (manufactured by Pattytech). The results are shown in Table 1.

TABLE 1

| | The number of times of CSS | Scratch |
|---|---|---|
| Example 1 | 80,000 times | No scratch of the disk was observed. |
| Example 2 | 70,000 times | No scratch of the disk was observed. |
| Comparative Example 1 | 50,000 times | Scratches of the disk were observed. |
| Comparative Example 2 | 10,000 times | Scratches of the disk were observed. |
| Comparative Example 3 | 10,000 times | Scratches of the disk were observed. |

It can be seen from the above results that the magnetic recording mediums obtained by using the lubricants of the present invention are excellent in durability.

The lubricant of the present invention does not have polar groups at the terminals of the molecule, but has at least two polar groups on the intermediate carbon chain of the molecule; Even when the length of the linear structure is increased, the physical adsorption force of the lubricant film to the surface of the film of an inorganic material such as metal, ceramic or carbon is strong and is loosened difficultly. Thus, even when centrifugal force is applied to the magnetic recording medium, the lubricant is difficultly scattered, and hence the lubricating function remains over a long period of time.

When the lubricant is allowed to exist on the surface of the magnetic recording medium, the absorption of the lubricant to the surface of the magnetic recording medium is strong, and hence the lubricating function remains over a long period of time even when the lubricant layer is very thin such as one molecule to several molecules thick.

Accordingly, the distance between the magnetic layer and the magnetic head can be shortened, which makes the magnetic recording medium suited for high-density recording.

Further, the magnetic layer and the magnetic head are difficultly damaged, and hence the magnetic recording medium is excellent in reliability.

While the present invention has been described in detail and with reference to specific embodiments thereof, it will be apparent to one skilled in the art that various changes and modifications can be made therein without departing from the spirit and the scope of the present invention.

What is claimed is:

1. A magnetic recording medium comprising a substrate having thereon a magnetic layer and a lubricant layer wherein said lubricant is provided on the outermost layer at a thickness of at most about 20 Å and is a compound which is devoid polar groups at the terminals of its molecule and which is represented by the following formula (I):

$$R_1—(Y—R_2)_k—Y—R_1 \quad (I)$$

wherein Y is selected from the group consisting of the divalent residue of a carboxyl group-containing compound, the divalent residue of an isocyanate group-containing compound and the divalent residue of a hydroxyl group-containing compound, and all Y groups in formula (I) may be the same or different when k is 2 or more;

$R_1$ represents a perfluoropolyether chain comprising a repeating unit of $(C_aF_{2a}O)_b$ wherein a is 1, 2 or 3, and b is at least 2, which is terminated by —$CF_3$ and has a number average molecular weight of about 400 to 10,000, and both $R_1$ groups in formula (I) may be the same or different;

$R_2$ represents a perfluoropolyether chain comprising a repeating unit of $C_cF_{2c}O)_d$ wherein c is 1, 2 or 3, and d is an integer of at least 1 and all $R_2$ groups in formula (I) may be the same or different when k is 2 or more; and k is an integer of at least 1.

2. A magnetic recording medium as claimed in claim 1, wherein the number of Y groups in formula (I) is 2 to 50.

3. The recording medium of claim 1, wherein said divalent residue of a carboxyl group-containing compound selected from the group consisting of:

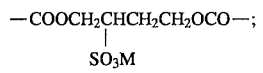

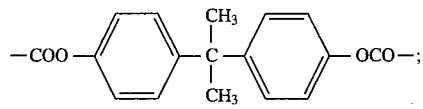

and

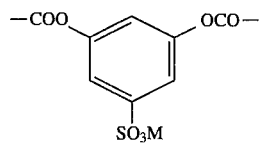

where M is H, Na or K;

said divalent residue of an isocyanate group-containing compound is selected from the group consisting of:

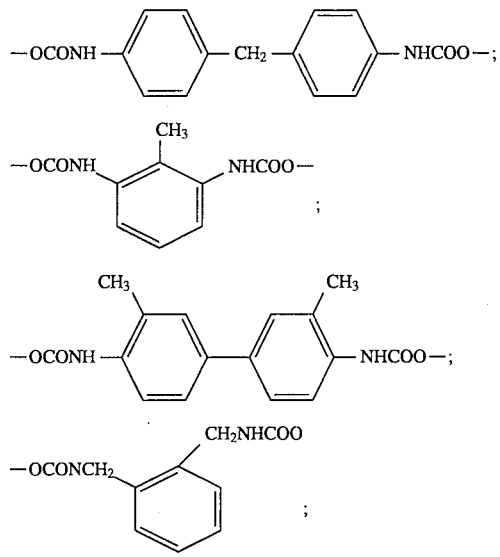

and

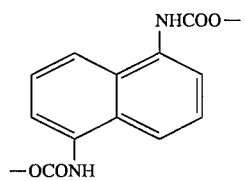

and said divalent residue of a hydroxyl group-containing compound is selected from the group consisting of:

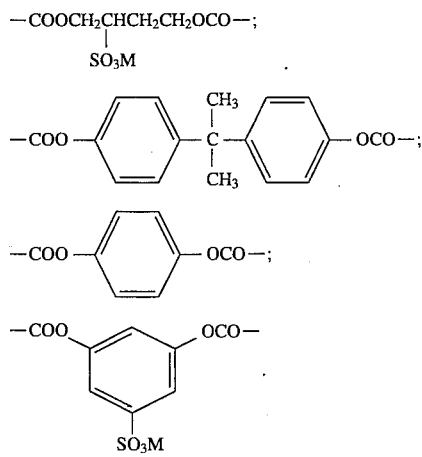

* * * * *